United States Patent
Daruwalla et al.

(10) Patent No.: US 12,341,543 B2
(45) Date of Patent: *Jun. 24, 2025

(54) SUPPORTING WIDEBAND INPUTS ON RF RECEIVERS

(71) Applicant: pSemi Corporation, San Diego, CA (US)

(72) Inventors: Parvez Daruwalla, San Diego, CA (US); Rong Jiang, San Diego, CA (US); Sung Kyu Han, San Diego, CA (US); Khushali Shah, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,249

(22) Filed: Apr. 3, 2024

(65) Prior Publication Data

US 2024/0250702 A1 Jul. 25, 2024

Related U.S. Application Data

(63) Continuation of application No. PCT/US2022/077276, filed on Sep. 29, 2022, which
(Continued)

(51) Int. Cl.
*H04B 1/10* (2006.01)
*H03F 1/08* (2006.01)
(Continued)

(52) U.S. Cl.
CPC ......... *H04B 1/0078* (2013.01); *H04B 1/0458* (2013.01); *H04B 1/10* (2013.01);
(Continued)

(58) Field of Classification Search
CPC ...... H04B 1/0078; H04B 1/0458; H04B 1/06; H04B 1/10; H04B 1/12; H04B 1/16;
(Continued)

(56) References Cited

U.S. PATENT DOCUMENTS 6,480,178 B1  11/2002  Itakura et al.
6,522,195 B2*  2/2003  Watanabe ............. H03F 3/1935
                                              330/51

(Continued)

FOREIGN PATENT DOCUMENTS

CN    101494441 A    7/2009
CN    111727560 B    12/2024
(Continued)

OTHER PUBLICATIONS

International Preliminary Report on Patentability (Chapter II) for International Application No. PCT/US2019/015477 filed on Jan. 28, 2019 on behalf of Psemi Corporation Mail Date: Feb. 12, 2020 17 pages.
(Continued)

*Primary Examiner* — Quochien B Vuong
(74) *Attorney, Agent, or Firm* — Steinfl + Bruno LLP

(57) ABSTRACT

Methods and devices to support multiple frequency bands in radio frequency (RF) circuits are shown. The described methods and devices are based on adjusting the effective width of a transistor in such circuits by selectively disposing matching transistors in parallel with the transistor. The presented devices and methods can be used in RF circuits including low noise amplifiers (LNAs), RF receiver frontends or any other RF circuits where input matching to wideband inputs is required.

20 Claims, 10 Drawing Sheets

Related U.S. Application Data is a continuation of application No. 17/505,329, filed on Oct. 19, 2021, now Pat. No. 11,539,382.

(51) Int. Cl.
| | |
|---|---|
| *H03F 3/19* | (2006.01) |
| *H04B 1/00* | (2006.01) |
| *H04B 1/04* | (2006.01) |
| *H04B 1/16* | (2006.01) |

(52) U.S. Cl.
CPC ............... *H04B 2001/0408* (2013.01); *H04B 2001/1054* (2013.01)

(58) Field of Classification Search
CPC ..... H04B 2001/1072; H03F 1/08; H03F 1/22; H03F 1/223; H03F 1/226; H03F 3/189; H03F 3/19; H03F 3/191; H03F 3/193; H03F 3/1935
See application file for complete search history.

(56) References Cited

U.S. PATENT DOCUMENTS

| | | | |
|---|---|---|---|
| 6,804,502 | B2 | 10/2004 | Burgener et al. |
| 7,910,993 | B2 | 3/2011 | Brindle et al. |
| 8,242,844 | B2 | 8/2012 | Rafi |
| 8,378,748 | B2 * | 2/2013 | Heikkinen ............. H03F 3/195 330/51 |
| 9,537,457 | B2 * | 1/2017 | Issakov ................... H03F 3/193 |
| 9,543,903 | B2 * | 1/2017 | Xu .......................... H03F 1/223 |
| 9,800,211 | B2 | 10/2017 | Nobbe et al. |
| 10,381,991 | B1 | 8/2019 | Sanner et al. |
| 10,938,348 | B1 | 3/2021 | Noori |
| 11,476,813 | B2 | 10/2022 | Sanner et al. |
| 11,539,382 | B1 | 12/2022 | Daruwalla et al. |
| 11,705,873 | B2 | 7/2023 | Sanner et al. |
| 12,212,291 | B2 | 1/2025 | Sanner et al. |
| 2006/0261912 | A1 | 11/2006 | Miyagi et al. |
| 2007/0024377 | A1 | 2/2007 | Wang et al. |
| 2011/0148526 | A1 | 6/2011 | Lu et al. |
| 2013/0106507 | A1 | 5/2013 | Signoff et al. |
| 2014/0113578 | A1 | 4/2014 | Xu et al. |
| 2014/0240048 | A1 | 8/2014 | Youssef et al. |
| 2014/0266461 | A1 | 9/2014 | Youssef et al. |
| 2015/0038093 | A1 | 2/2015 | Connell et al. |
| 2015/0263691 | A1 | 9/2015 | Takahashi |
| 2018/0026592 | A1 | 1/2018 | Wallis |
| 2019/0245497 | A1 | 8/2019 | Sanner et al. |
| 2021/0135636 | A1 | 5/2021 | Sanner et al. |

FOREIGN PATENT DOCUMENTS

| | | |
|---|---|---|
| DE | 112019000639 T5 | 10/2020 |
| WO | 2016/076962 A1 | 5/2016 |
| WO | 2019/152326 A1 | 8/2019 |
| WO | 2023/069831 A1 | 4/2023 |

OTHER PUBLICATIONS

International Search Report and Written Opinion for International Application No. PCT/US2019/015477 filed on Jan. 28, 2019 on behalf of Psemi Corporation Mail Date: Apr. 29, 2019 12 pages.

International Search Report and Written Opinion for International PCT Application No. PCT/US2022/077276 filed on Sep. 29, 2022, on behalf of pSemi Corporation, Mailed on Jan. 25, 2023, 8 Pages.

Non-Final Office Action for U.S. Appl. No. 15/887,816, filed Feb. 2, 2018 on behalf of Psemi Corporation Mail Date: Feb. 15, 2019 14 pages.

Non-Final Office Action for U.S. Appl. No. 16/968,024, filed Aug. 6, 2020 on behalf of Psemi Corporation Mail Date: Nov. 19, 2021 14 pages.

Notice of Allowance for U.S. Appl. No. 15/887,816, filed Feb. 2, 2018 on behalf of Psemi Corporation Mail Date: Jun. 6, 2019 14 pages.

Notice of Allowance for U.S. Appl. No. 16/968,024, filed Aug. 6, 2020 on behalf of Psemi Corporation Mail Date: Jun. 10, 2022 16 pages.

Notice of Allowance issued for U.S. Appl. No. 17/505,329, filed Oct. 19, 2021, on behalf of pSemi Corporation. Mail Date: Jul. 22, 2022. 10 pages.

Notice of Allowance issued for U.S. Appl. No. 17/505,329, filed Oct. 19, 2021, on behalf of pSemi Corporation. Mail Date: Oct. 13, 2022. 9 pages.

Petition to Revive Application Granted for U.S. Appl. No. 16/968,024, filed Jan. 28, 2019 on behalf of pSemi Corporation, mailing date Sep. 29, 2020. 1 page.

Psemi Corporation, Response filed in the USPTO dated May 14, 2019 for U.S. Appl. No. 15/887,816, 10 pgs.

Written Opinion of the International Preliminary Examining Authority for International Application No. PCT/US2019/015477 filed on Jan. 28, 2019 on behalf of Psemi Corporation Mail Date: Dec. 13, 2019 7 pages.

Office Action for CN Application No. 201980011004.0 filed on Jul. 30, 2020 on behalf of Psemi Corporation. Mail Date: Mar. 8, 2024. 14 pages.

* cited by examiner

| LNA band | T1 | T3 | S3 | S4 |
|---|---|---|---|---|
| High frequency | ON | OFF | OFF | OFF |
| Low frequency | ON | ON | ON | ON |

| LNA band | T1 | T3 | T4 | S3/S4 | S5/S6 |
|---|---|---|---|---|---|
| High frequency | ON | OFF | OFF | OFF | OFF |
| Middle. Frequency | ON | ON | OFF | ON | OFF |
| Low frequency | ON | ON | ON | ON | ON |

SUPPORTING WIDEBAND INPUTS ON RF RECEIVERS

CROSS-REFERENCE TO RELATED APPLICATIONS

The present application is a continuation of International Pat. App. No. PCT/US2022/077276 filed on Sep. 29, 2022 which, in turn, is a continuation of U.S. patent application Ser. No. 17/505,329 filed on Oct. 19, 2021, now U.S. Pat. No. 11,539,382 issued Dec. 27, 2022, the contents of all of which are incorporated herein by reference in their entirety.

BACKGROUND

(1) Technical Field

The present disclosure is related to methods and devices used in radio frequency (RF) systems to support wideband inputs, more in particular to methods and devices supporting the wideband requirements on the auxiliary (AUX) inputs of the RF receiver front-ends including low noise amplifiers (LNAs).

(2) Background

As part of the RF receiver front-end, communication modules containing one or more LNAs are generally implemented. Depending on the application, it is often highly desired to include tunable AUX inputs to such LNAs. The AUX inputs are required to cover several bands within a wide frequency range. Such AUX inputs are generally used by the phone manufacturers as a technique to be able to assign some bands to the LNAs based on the region in which the phone is to be sold, and not depend on module level filtering. This will provide a highly desired flexibility by allowing the same communication module to be reconfigured in several geographic regions and to be useful with future revisions. In order to achieve this, the AUX input to the LNA is implemented as a non-filtered input on the module, so that an external phone board filter may be used to support a particular band. However, the LNA is still needed to meet stringent wideband operational frequency requirements as imposed by some applications without sacrificing the overall performance of the LNA.

It is known in the art that LNAs are inherently difficult to tune/match over the wide bandwidth required of AUX ports. There are some existing solutions to address the above-mentioned problem. In what follows such existing solutions are described.

FIG. 1 shows a prior art LNA (100) including transistors (T1, T2) arranged in a cascode configuration. LNA (100) further includes output matching circuit (101) wherein a combination of inductor (L1) with variable capacitors (C1, C2) provides the output matching functionality. A combination of inductor (L2), variable capacitor (Cgs), and inductor (L3) is used to tune into the input frequency band of operation. The tuning can be adjusted through variable capacitor (Cgs) implemented across gate-source terminals of transistor (T1). The higher the capacitance of capacitor (Cgs) selected, the lower is the frequency the LNA is tuned into.

FIG. 2 shows another prior art LNA (200) which has similar functionalities as LNA (100) of FIG. 1 except for the addition of input matching inductors (L3, L4) each of which can be switched in and out using switches (S1, S2) to accommodate different frequency bands. The combination of inductors (L3, L4) can be used for coarse input tuning while variable capacitor (Cgs) can then be used for fine tuning purposes. Any of the input matchings inductors (L3, L4) can be implemented externally to the module, within the module, or within an integrated circuit containing the LNA.

SUMMARY

The disclosed methods and devices address the above-mentioned problems, and provide solutions to the described design challenges with minimal impacts on the overall RF receiver front-end performance parameters such as noise-figure (NF), gain, and size.

According to a first aspect of the present disclosure, a radio frequency (RF) circuit is provided, the RF circuit comprising: a transistor; an input terminal coupled to a gate terminal of the transistor; an output terminal coupled to a drain terminal of the transistor; one or more additional transistors, each having: a gate terminal configured to selectively couple to and decouple from the input terminal; a drain terminal and a source terminal, wherein either the drain terminal is configured to selectively connect to and disconnect from the drain terminal of the transistor and the source terminal is connected to the source terminal of the transistor, or the source terminal is configured to selectively connect to and disconnect from the source terminal of the transistor and the drain terminal is connected to the drain terminal of the transistor, or the drain terminal and the source terminal are configured to selectively connect to and disconnect from the drain terminal and source terminal of the transistor, respectively.

According to a second aspect of the present disclosure, a method of supporting multiple input frequency bands in a radio frequency (RF) circuit comprising a transistor is disclosed, the method comprising: arranging the transistor in a common-source configuration; coupling a gate terminal of the transistor to an input terminal where an input signal is applied; providing one or more additional transistors; selectively coupling a gate terminal of each additional transistor of the one or more additional transistors to the input terminal; selectively connecting a drain terminal of the each additional transistor to a drain terminal of the transistor; connecting a source terminal of the each additional transistor to a source terminal of the transistor; and based on a selected frequency band, switching in and out the each additional transistor.

The details of one or more embodiments of the present disclosure are set forth in the accompanying drawings and the description below. Other features, objects, and advantages of the invention will be apparent from the description and drawings, and from the claims.

DESCRIPTION OF THE DRAWINGS

FIG. 4 shows an exemplary table summarizing the states of switches and transistors according to an embodiment of the present disclosure.

FIG. 6 shows an exemplary table summarizing the states of switches and transistors according to an embodiment of the present disclosure.

Like reference numbers and designations in the various drawings indicate like elements.

DETAILED DESCRIPTION

Figure 3A:
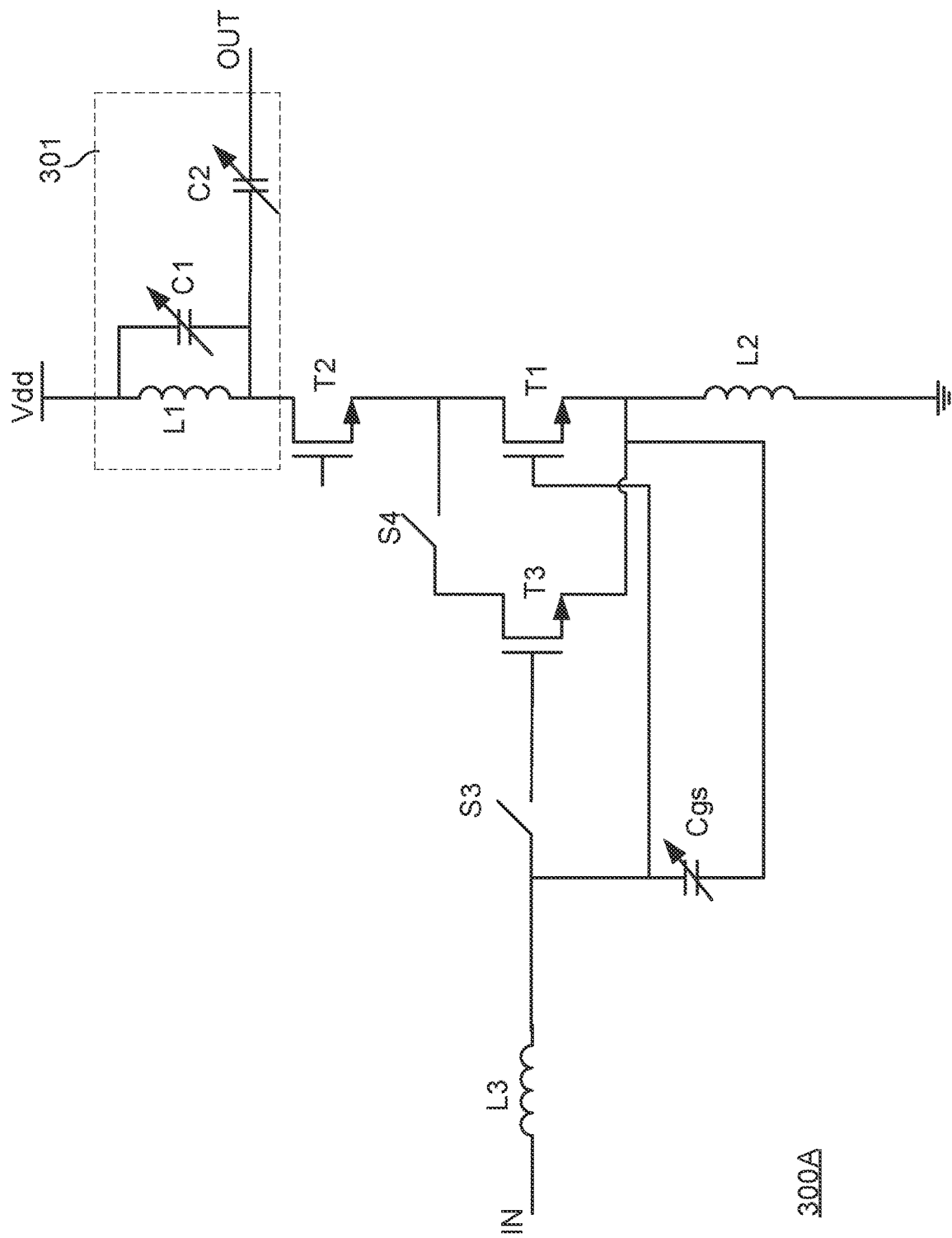
FIG. 3A shows an exemplary LNA according to an embodiment of the present disclosure.

FIG. 3A shows an exemplary LNA (300A) according to an embodiment of the present disclosure. LNA (300A) comprises transistors (T1, T2) arranged in a cascode configuration and output matching circuit (301) wherein a combination of inductor (L1) with variable capacitors (C1, C2) provides the output matching functionality. LNA (300A) further comprises transistor (T3) and programmable switches (S3, S4). When both switches (S3, S4) are ON (closed), transistor (T3) is switched in, parallel to transistor (T1). When switches (S3, S4) are OFF (open), transistor (T3) is switched out of the circuit. As can be noticed, transistor (T1) is arranged in a common-source configuration. LNA (300A) further comprises inductors (L2, L3) and variable capacitor (Cgs). A combination of inductor (L2), variable capacitor (Cgs), and inductor (L3) may be used for input matching purposes, i.e. to tune into the input frequency band of operation. The tuning can be varied through variable capacitor (Cgs) implemented across gate-source terminals of transistor (T1). The higher the capacitance of capacitor (Cgs) selected, the lower is the frequency the LNA is tuned into.

As it is known in the art of RF design, devices with smaller sizes are generally implemented to accommodate higher frequency bands. The reason is to support lower parasitic capacitances for higher gains (i.e. gm). In other words, wider transistors are more adapted to operate at lower frequencies.

According to the teachings of the present disclosure, one way to extend the lower frequency support of, for example, an LNA, is to selectively increase the effective width of the transistor implemented as part of such LNA. As an example, by selectively arranging two separate transistors in parallel, the frequency bands of operation of the circuit can further cover lower frequency sub-bands.

In order to further clarify the teachings disclosed above, reference is made again to FIG. 3A, where in order to accommodate a wider effective operational bandwidth, programmable switches (S3, S4) are implemented as part of LNA (300A). During operative conditions, programmable switches (S3, S4) may be ON (closed) to switch in transistor (T3) such that transistor (T3) is arranged in parallel with transistor (T1). As such, the combination of transistors (T1, T3) will function as an effectively wider device to accommodate lower frequency sub-bands. On the other hand, when programmable switches (S3, S4) are OFF (open), transistor (T3) is switched out so that LNA (300A) could support higher frequency sub-bands. As a result, by virtue of switching transistor (T3) in and out of the circuit depending on the selected operational sub-band, the overall supported frequency bands can be extended. Table (400) of FIG. 4 summarizes the states of the switches (S3, S4) and transistor (T1, T3) when operating at a lower or higher frequency sub-band, as described above. As an example, either of the high or low frequency bands may be frequency bands centered around a frequency of few GHz, with a bandwidth of several GHz.

Referring back to FIG. 3A, the size of each transistor (T1, T3) may be selected to meet the frequency bands requirements. The person skilled in the art will appreciate that the addition/removal of transistor (T3) by way of programmable switching has negligible impact on the overall size, noise figure (NF) and gain performance of LNA (300A) for higher frequency operation, while the gain/NF performance is improved in lower frequency operation. The size of transistor (T3) is generally substantially smaller than the overall die size. Switches (S3, S4) may be sized to have negligible impact on NF performance in the high frequency mode of operation. Larger size will improve low frequency operation but have larger parasitics in high frequency operation, and vice versa. The loss due to the addition of variable capacitor (Cgs) may compensated by the gain of transistor (T3) to obtain an overall desired gain performance. Additionally, switches (S3, S4) generally are not disposed close to die bumps, in other words, switches (S3, S4) do not need to be designed to survive ESD (electrostatic discharge). The presence of transistor (T3) also provides more flexibility in terms of the required range of capacitance values for capacitor (Cgs), meaning that capacitor (Cgs) may be designed to have a smaller size for a smaller tuning range. In other words, transistor (T3) may be designed for coarse tuning while capacitor (Cgs) may be used for fine tuning into the required frequency bands.

Figure 3B:
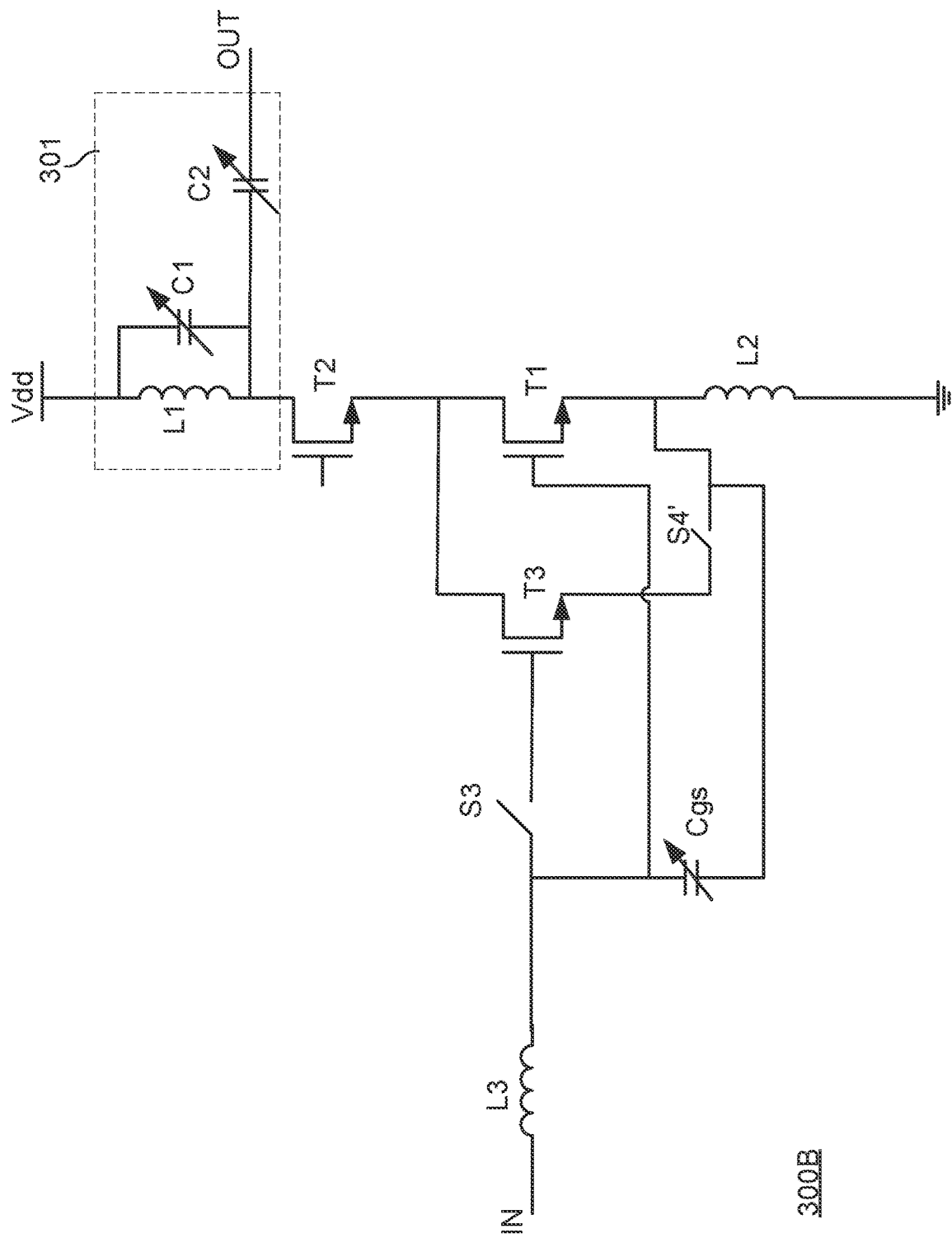
FIG. 3B shows an exemplary LNA according to an embodiment of the present disclosure.

With continued reference to FIG. 3A, the person skilled in the art will understand that output matching network (301) as shown, is only one example of implementation, and other structures to implement the output matching network (301) may also be envisaged. Similarly, the overall structure of LNA (300A) is served herein as an exemplary illustration of the disclosed teachings and LNAs with different structure benefiting from the same teachings may also be implemented. As an example, LNAs without cascode transistor (T2) or with any number of cascode transistors may also be implemented in accordance with the teachings of the present disclosure. In some embodiments, switch (S4) may be implemented in source-terminal side of transistor (T3), instead of drain-terminal side as shown in FIG. 3A. FIG. 3B shows such an embodiments wherein switch (S4') is implemented in the source-terminal side of transistor (T3). The functionality of LNA (300B) of FIG. 3B is similar to what is described throughout the document with regards to LNA (300A) of FIG. 3A.

Figure 5:
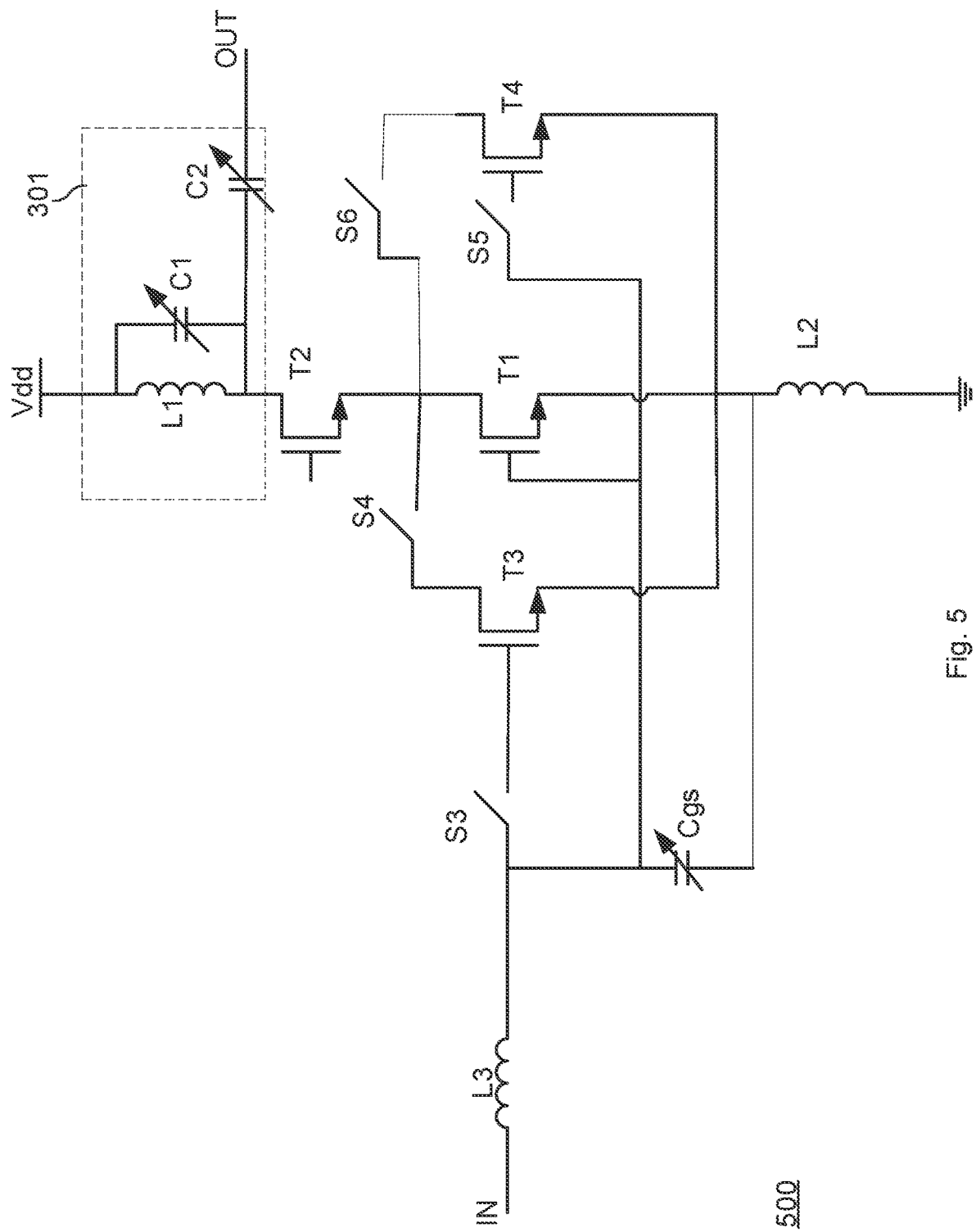
FIG. 5 shows an exemplary LNA according to an embodiment of the present disclosure.

With further reference to FIG. 3A, embodiments implementing any number of parallel transistors may also be envisaged. Such embodiments may be used to accommodate a plurality of sub-bands depending on the applications and related frequency band requirements. FIG. 5 shows an exemplary LNA (500) according to an embodiment of the present disclosure. The principle of operation of LNA (500) of FIG. 5 is similar to what was described with regards to LNA (300A) of FIG. 3A, except that the additional transistor (T4) provided is also switchable in the same fashion as transistor (T3) of FIG. 3A. Programmable switches (S5, S6) are used to switch transistor (T4) in and out such that when switched in, transistor (T4) is arranged in parallel with transistors (T2, T3). As such, depending on the states of switches (S3, . . . , S6), the combination of transistors (T1, T3), or (T1, T4), or (T1, T3, T4) will function as an effective plurality of devices with selectable width to accommodate various lower frequency sub-bands.

FIG. 6 shows table (600) summarizing the states of switches (S3, . . . , S6) and transistors (T1, . . . , T3, T4) when supporting various frequency sub-bands. As can be seen in FIGS. 5-6, in order to support the higher frequency band, transistor (T1) is ON and transistors (T3, T4) are switched out by opening all the switches (S3, . . . , S6). Moreover, in order to support and operate in the middle frequency band, transistor (T3) is switched in by closing switches (S3, S4). Finally, both transistors (T3, T4) are switched in by closing switches (S3, . . . , S6) to accommodate the lower frequency sub-band. The person skilled in the art will understand that table (600) of FIG. 6 is an exemplary table, and without departing from the spirit and scope of the invention, any combination of devices/transistors in parallel could be used to achieve the desired LNA performance over the required bands. As mentioned previously, the sizes of transistors (T1, T2, T3, T4) may vary depending on the frequency bands that need to be supported by LNA (500). Selecting the number of transistors to be added in parallel in such embodiment is a matter of achieving the right balance between the number of supported bands and the desired overall performance of the LNA.

Figure 7:
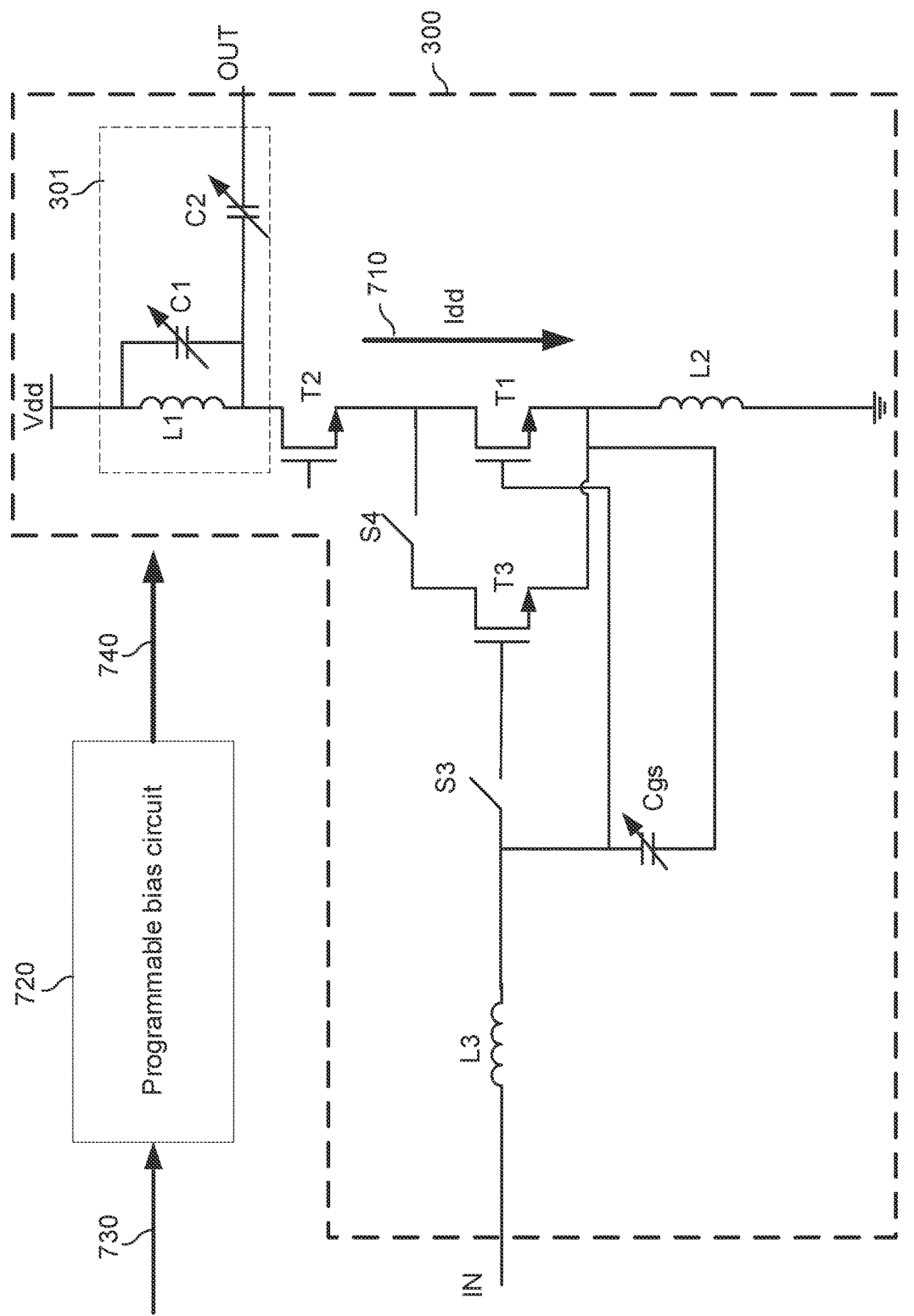
FIG. 7 shows an exemplary LNA according to an embodiment of the present disclosure.

FIG. 7 shows an exemplary LNA (700) according to an embodiment of the present disclosure. LNA (700) comprises LNA (300A) of FIG. 3A and programmable bias circuit (720). The role of the programmable bias circuit (720) is to ensure that DC bias current (Idd), represented by arrow (710) and flowing through transistors (T1, T2, T3), remains the same during operative conditions regardless of what states switches (S3, S4) are in. This is highly desired in order to maintain the overall required performance of LNA (700). In some embodiments programmable bias circuit (720) may provide optimum current flow for each selected band. In other words, slight variations in current may be needed to reduce Gain, NF, and IIP3 variations across all selectable frequency bands. Depending on the frequency selection input (730), i.e. the selected operational frequency bands, the programmable bias circuit (720) provides bias voltages or currents, as indicated by arrow (740), required to maintain the same current (Idd) during operation and regardless of the frequency band LNA (700) is tuning into. In another embodiment, programmable bias circuit (720) can be combined with LNA (500) of FIG. 5 or any other embodiment in accordance with the teachings of the present disclosure to provide the same functionalities as described above with regards to LNA (700) of FIG. 7. The embodiment of FIG. 7 can also be applied to the architecture of FIG. 5, with similar considerations.

Figure 8:
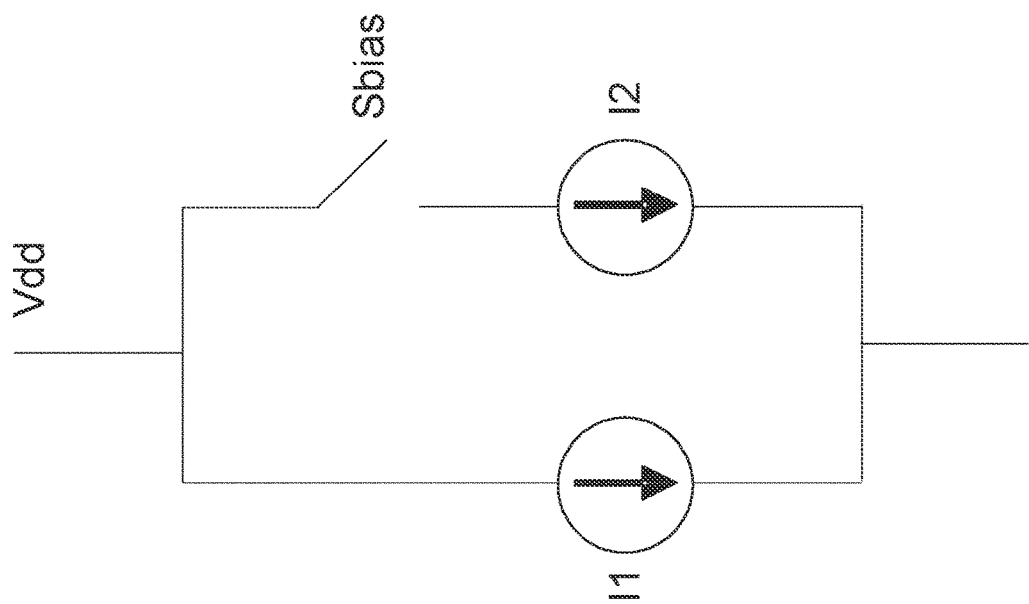
FIG. 8 shows an exemplary programmable bias circuit according to an embodiment of the present disclosure.

FIG. 8 shows an exemplary programmable bias circuit (800) in accordance with the teachings of the present disclosure. Programable bias circuit (800) represents an exemplary implementation of programmable bias circuit (720) of FIG. 7. In higher frequency modes switch (Sbias) is in ON state and a combination of current sources (I1, I2) provide higher current to the LNA. On the other hand, in lower frequency modes of operations, switch (Sbias) is in OFF state providing smaller current (i.e., only I1) to the LNA.

Figure 1:
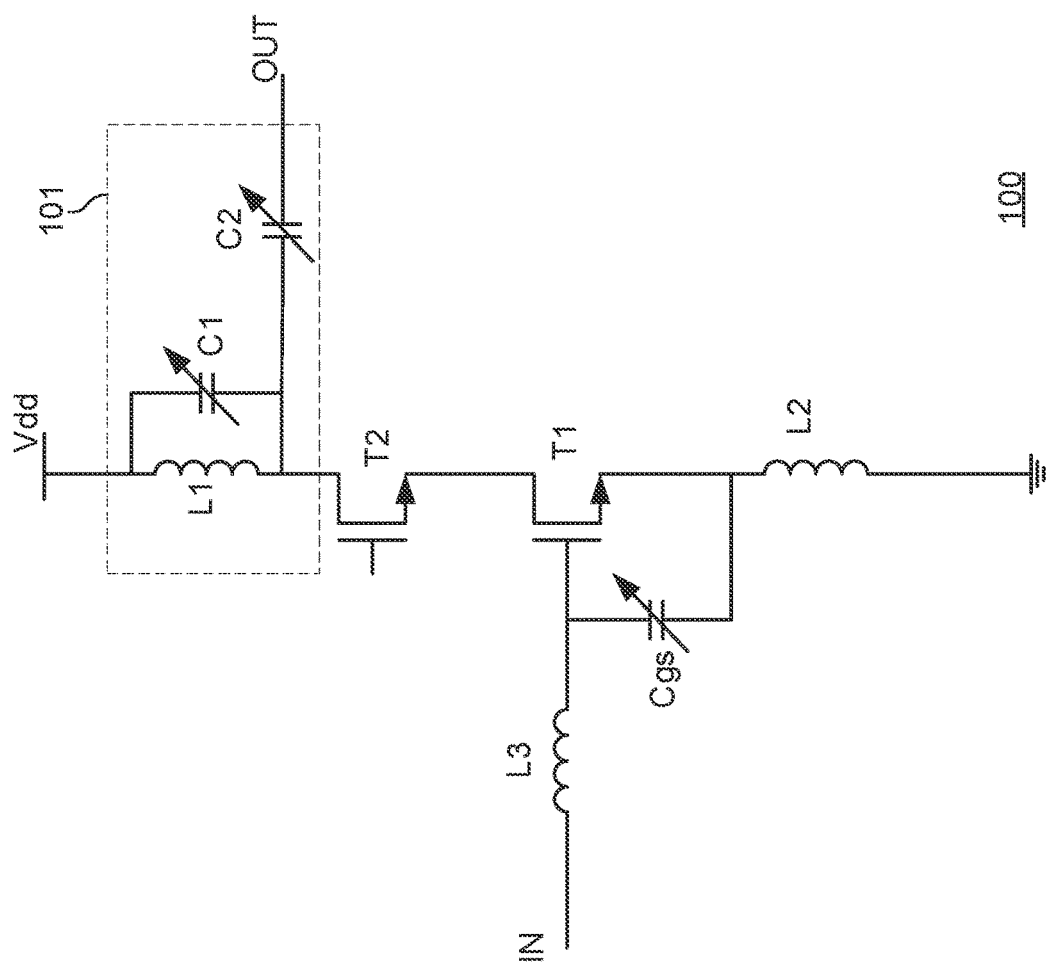
FIGS. 1-2 show prior art LNAs.
Figure 2:
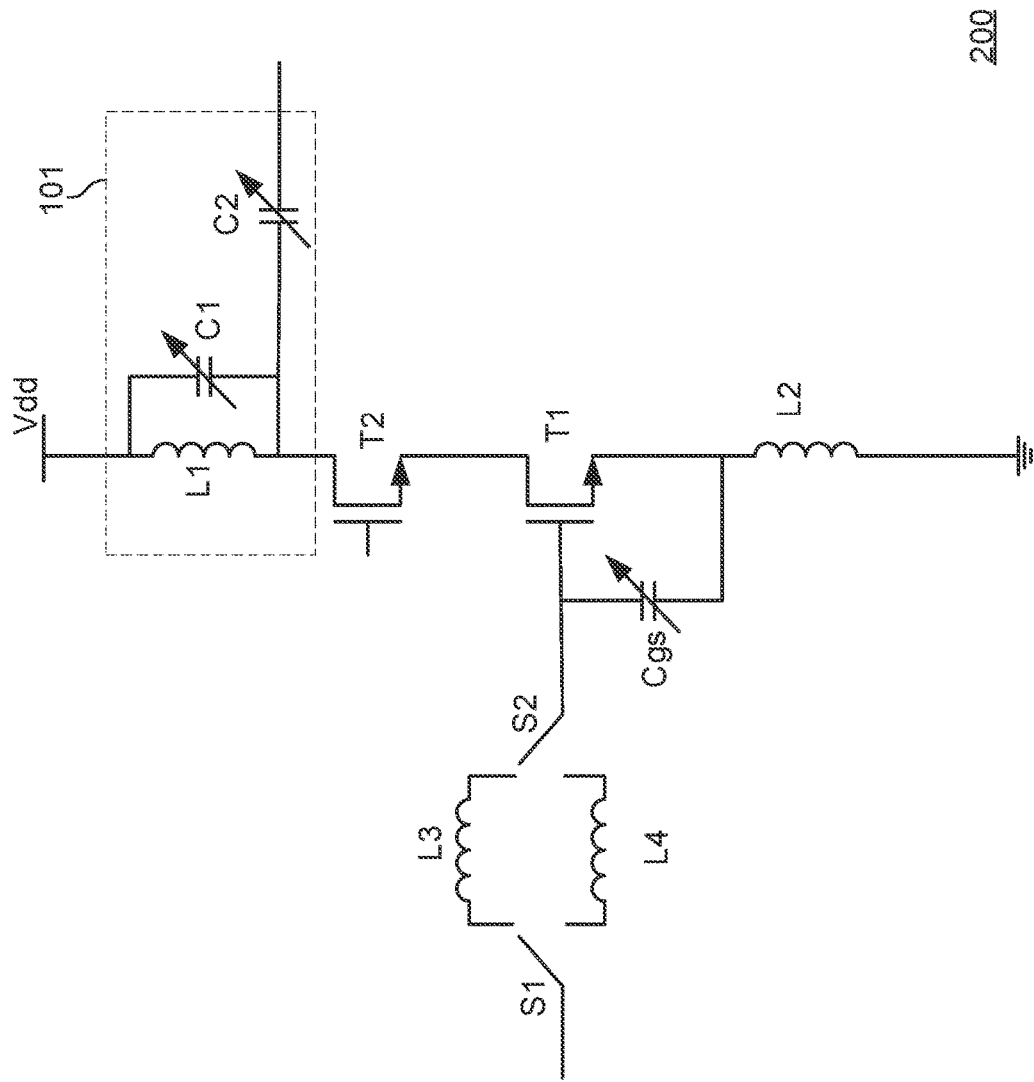
Figure 9:
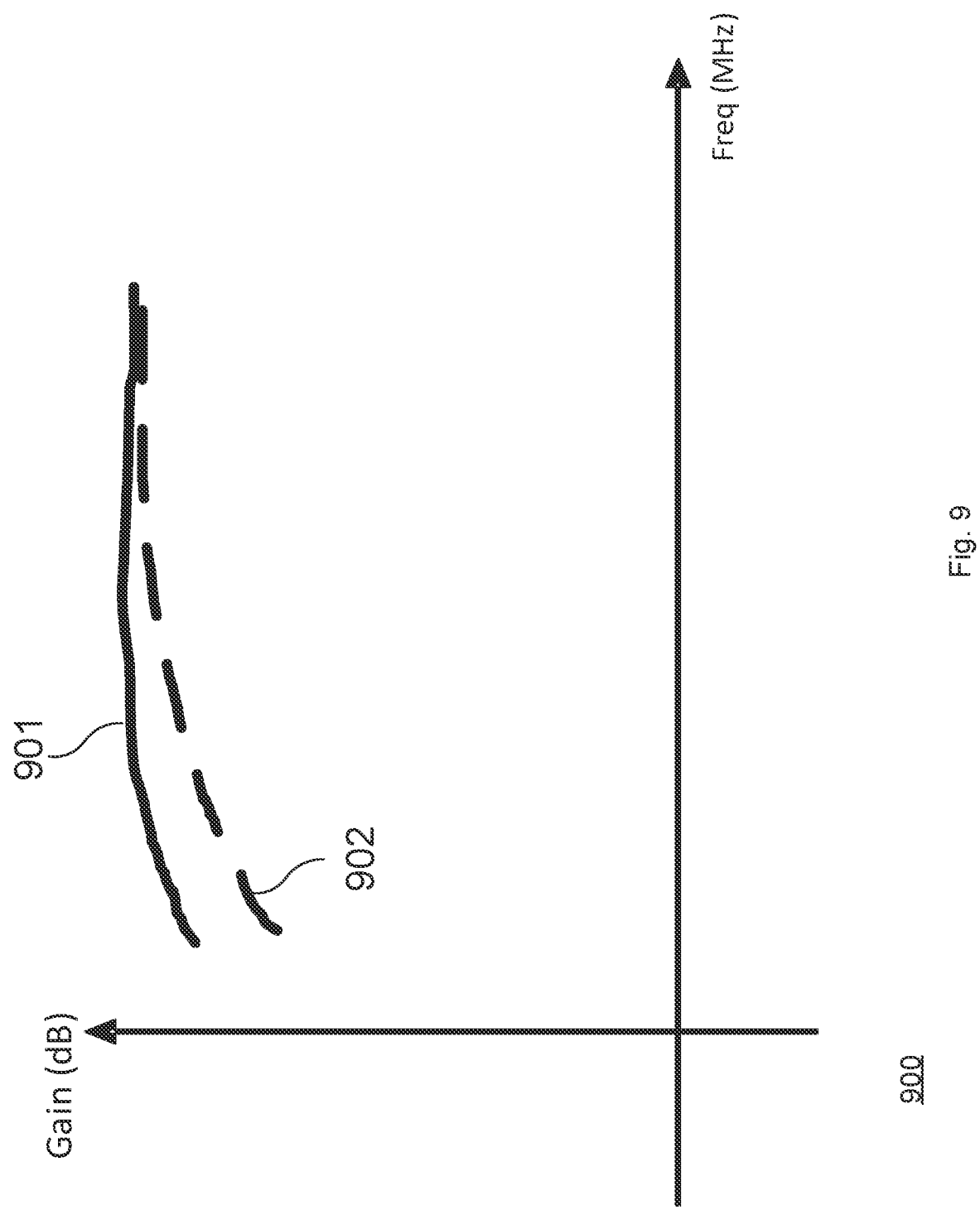
FIG. 9 shows an exemplary graph representing the gain flatness with and without implementing the teachings of the present disclosure.

FIG. 9 shows an exemplary graph (900) representing gain flatness in accordance with the embodiments of the present disclosure. Curve (901) represents the gain vs. frequency in the case of LNAs (300A, 300B) of FIGS. 3A-3B. Curve (902) represents the gain vs. frequency in the case of prior art LNA (100) of FIG. 1. As can be noticed, implementation of the disclosed methods results in improved gain flatness over the required frequency range.

With reference to FIGS. 3A-3B, 5, and 7, programmable switches (S3, . . . , S6) may be controlled by a control circuit.

Embodiments of FIGS. 3A-3B, 5, and 7 may be implemented as part of an RF receiver front-end, a communication system or module with wideband input requirements.

In preferred embodiments, the disclosed methods are applied to RF front-end receivers or the LNAs. However, the person skilled in the art will understand that the usage of the disclosed methods and devices is not limited to RF receiver front-ends or the LNAs, and such methods and devices can also be applied to or implemented in any of the RF circuits to support wideband input requirements.

The term "MOSFET", as used in this disclosure, includes any field effect transistor (FET) having an insulated gate whose voltage determines the conductivity of the transistor, and encompasses insulated gates having a metal or metal-like insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A radio frequency (RF) circuit comprising:
a transistor element comprising an input transistor having a gate terminal coupled to an input terminal, and a drain terminal coupled to an output terminal; the transistor being configured to receive an input RF signal at the input terminal;
wherein
an effective width of the transistor element is configured to be selectively adjusted based on a detected bandwidth of the input RF signal to improve handling of the input RF signal.

2. The RF circuit of claim 1, wherein the transistor element includes one or more additional transistors, each being configured to be selectively:

A) coupled to the input transistor in a parallel arrangement,
wherein:
drain terminals of the one or more additional transistors and the input transistors are tied together;
source terminals of the one or more additional transistors and the input transistors are tied together, and
gate terminals of the one or more additional transistors and the input transistors are tied together,
and
B) decoupled from the input transistors.

3. The RF circuit of claim 2, further comprising:
a first inductor coupling the source terminal of the input transistor to ground;
a second inductor coupling the input terminal to the gate of the input transistor;
a variable capacitor coupled across the gate and the source terminals of the input transistor, and
wherein a combination of the first inductor, the second inductor, and the variable capacitor is configured for tuning the RF circuit.

4. The RF circuit of claim 3, comprising:
a first switch coupling the second inductor to the gate terminal of an additional transistor of the one or more additional transistors;
a second switch coupling the drain terminal of the additional transistor to the drain terminal of the transistor.

5. The RF circuit of claim 4, wherein:
in a first state where a first frequency band is selected, the first switch and the second switch are open;
in a second state where a second frequency band is selected, the first switch and the second switch are closed, and
a center frequency of the first frequency band is greater than a center frequency of the second frequency band.

6. The RF circuit of claim 5, further comprising a control circuit configured to control the first switch and the second switch.

7. The RF circuit of claim 4, wherein the one or more additional transistors comprise two or more additional transistors, the RF circuit further comprising:
a third switch coupling the drain terminal of a second additional transistor of the two or more additional transistors to the drain terminal of the input transistor;
a fourth switch coupling the second inductor to a gate terminal of the second additional transistor.

8. The RF circuit of claim 7, wherein:
in a first state where a first frequency band is selected, the first switch, the second switch, the third switch, and the fourth switch are open;
in a second state where a second frequency band is selected, the first switch and the second switch are closed, and the third switch and the fourth switch are open;
in a third state where a third frequency band is selected, the first switch, the second switch, the third switch, and the fourth switch are closed, and
a center frequency of the first frequency band is greater than a center frequency of the second frequency band, and a center frequency of the second frequency band is greater than a center frequency of the third frequency band.

9. The RF circuit of claim 2, wherein:
in a first state where a first frequency band is selected, the one or more additional transistors are switched out;

in a second state where a second frequency band is selected, a first additional transistor of the one or more transistors is switched in, and a center frequency of the first frequency band is greater than a center frequency of the second frequency band.

10. The RF circuit of claim 9, wherein:

the one or more additional transistors comprise two or more additional transistors;

in the first state, a first additional transistor of the two or more transistors is switched out;

in the second state, the second additional transistor is switched out, in a third state where a third frequency band is selected, the first and the second additional transistors are switched in, and the center frequency of the second frequency band is greater than a center frequency of the third frequency band.

11. The RF circuit of claim 10, configured such that in the first, second and third states, a DC bias current through the drain or source terminal of the input transistor is the same.

12. The RF circuit of claim 9, configured such that in the first state and in the second state, a DC bias current through the drain or source terminal of the input transistor is the same.

13. The RF transistor of claim 12, further comprising a programmable bias circuit configured to control the DC bias current through the drain or source terminal of the input transistor.

14. The RF transistor of claim 13, wherein the programmable bias circuit comprises a first current source arranged in parallel with a switchable second current source.

15. The RF circuit of claim 2, wherein the input transistor is arranged in a common-source configuration.

16. The RF circuit of claim 2, further comprising an output matching network coupling the transistor to the output terminal, and wherein the output matching network comprises one or more variable capacitors and one or more inductors.

17. A low noise amplifier comprising the RF circuit of claim 2.

18. An RF front-end comprising the RF circuit of claim 2.

19. The RF circuit of claim 2, further comprising a cascode transistor arranged in a cascode configuration with the input transistor.

20. A radio frequency (RF) circuit comprising:

a transistor element comprising an input transistor having a gate terminal coupled to an input terminal, and a drain terminal coupled to an output terminal; the transistor being configured to receive an input RF signal at the input terminal, and a programmable bias circuit configured to control a DC bias current through the drain or source terminal of the input transistor, and wherein an effective width of the transistor element is configured to be selectively adjusted based on a bandwidth of the input RF signal.

* * * * *